United States Patent [19]

Werner

[11] 4,131,301

[45] Dec. 26, 1978

[54] CHASSIS FOR A MOBILE HOME

[75] Inventor: Michael F. Werner, Elkhart, Ind.

[73] Assignee: Skyline Corporation, Elkhart, Ind.

[21] Appl. No.: 811,049

[22] Filed: Jun. 29, 1977

[51] Int. Cl.² .............................................. B62D 63/06
[52] U.S. Cl. .................................... 280/789; 280/795; 296/28 F
[58] Field of Search ............... 280/106 R, 106 T, 789, 280/795; 296/28 F, 26

[56] References Cited

U.S. PATENT DOCUMENTS

| 2,494,115 | 1/1950 | Bock et al. | 280/106 T |
| 3,520,551 | 7/1970 | Sellers | 280/106 T |

FOREIGN PATENT DOCUMENTS 460047 10/1949 Canada ............................... 280/106 R Primary Examiner—Richard A. Bertsch
Attorney, Agent, or Firm—Oltsch, Knoblock & Hall

[57] ABSTRACT

A chassis for a mobile home having outriggers which project laterally from the longitudinal frame members of the chassis and which are each formed of a return bent, one piece construction.

7 Claims, 11 Drawing Figures

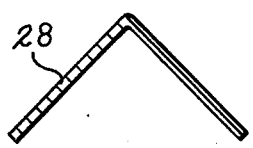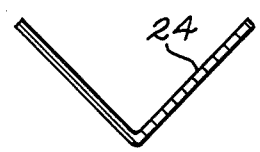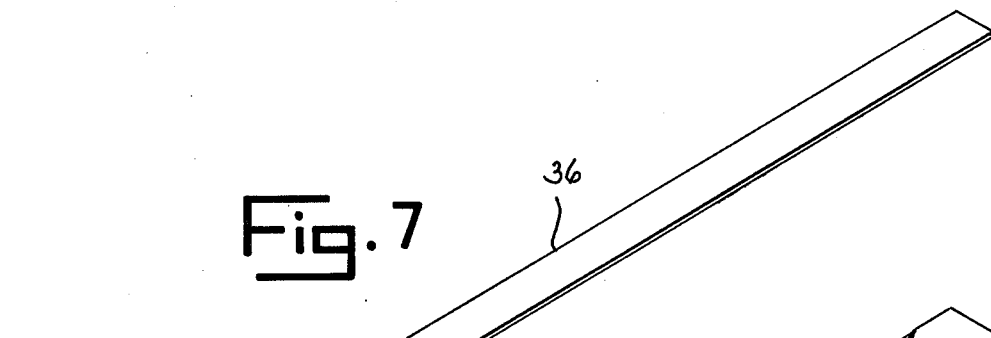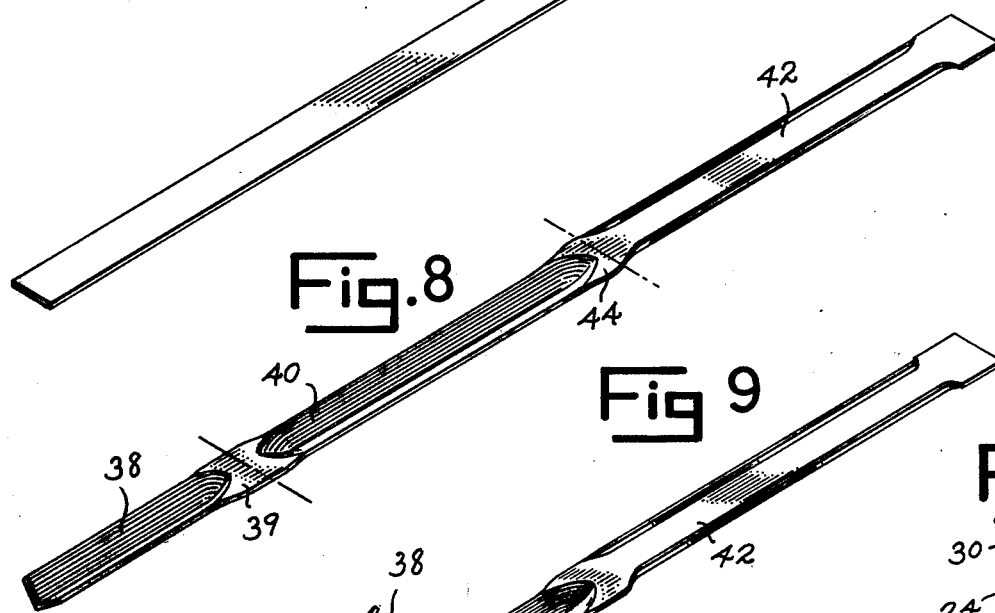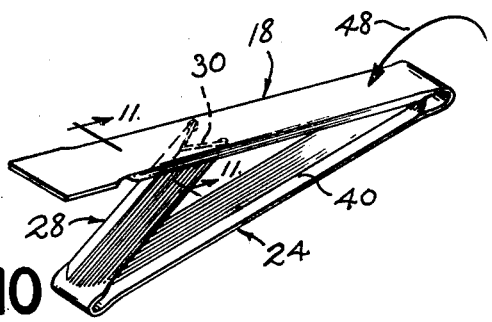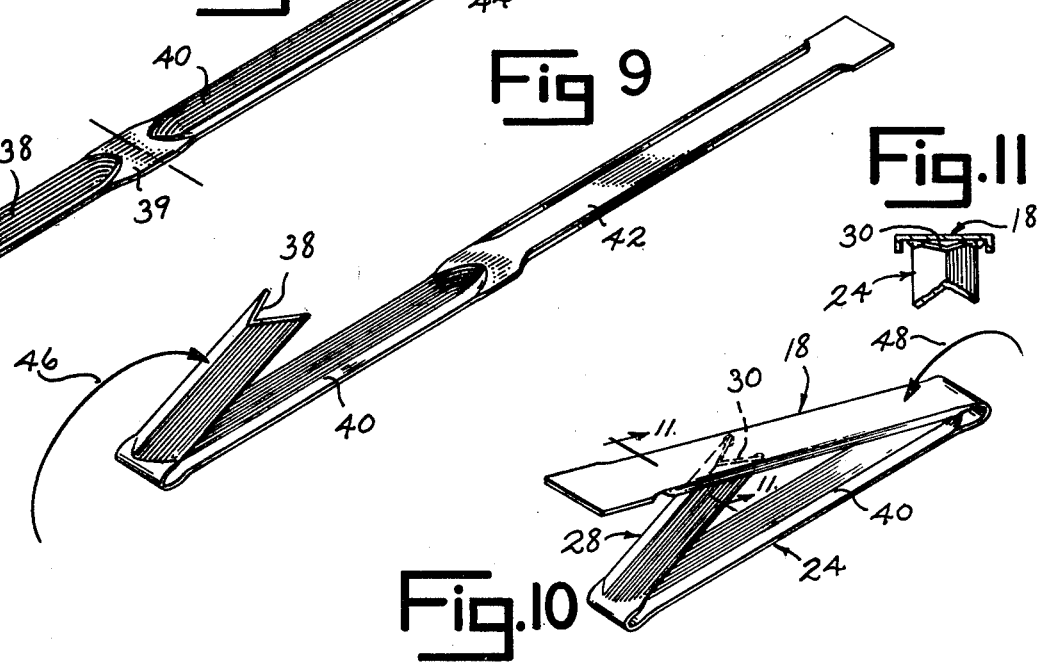

CHASSIS FOR A MOBILE HOME

BACKGROUND OF THE INVENTION

This invention relates to a chassis for mobile homes and will have specific application to the improved construction of outriggers which form a part of the chassis.

The chassis for mobile homes is of a frame construction which include parallel horizontal longitudinal frame members interconnected by transverse frame members. The spacing between longitudinal frame members does not extend the full width of the mobile home, and thus it is customary to provide the chassis with outriggers which project laterally outwardly from the longitudinal frame members at selected spaced intervals. Such outriggers in conjunction with the longitudinal and transverse frame members serve as support for the overlying mobile home structure.

Heretofore, outriggers for mobile home chassis have been generally of two designs. One such design has the outrigger constructed of intersecting angle irons tied together by rod material. An outrigger of this nature requires a high labor cost for its fabrication. The second design of such outriggers is of the one piece sheet steel construction which is blanked or sheared to size and then provided with rigidifying flanges. An example of this type of outrigger can be found in U.S. Pat. No. 3,520,551. Outriggers of this type have a substantial material cost as well as a high labor cost due to the handling, sizing and forming of the outrigger.

SUMMARY OF THE INVENTION

This invention relates to a chassis for a mobile home or similar structure having an improved outrigger construction. Each outrigger of the chassis is formed from a single strip of steel or similar structural material and includes an upper horizontal section which extends laterally outwardly from a longitudinal frame part of the chassis and which is downwardly return bent to form an angled section which extends to the frame member and which in turn is upwardly return bent to form a brace section which extends to the horizontal section of the outrigger intermediate its ends. Each outrigger may be constructed by first forming the elongated strip of starting material into rigidifying channel sections and then bending the material into form. Welding of the outrigger follows. In this manner, a structural part of a mobile home chassis is economically provided.

Accordingly, it is an object of this invention to provide a chassis for a mobile home or similar structure having improved laterally directed outriggers.

Another object of this invention is to provide an economical, structurally sound outrigger for a mobile home chassis.

Other objects of this invention will become apparent upon a reading of the invention's description.

BRIEF DESCRIPTION OF THE DRAWINGS

A preferred embodiment of this invention has been chosen for the purpose of illustration wherein:

FIG. 4 is a sectional view taken along line 4—4 of FIG. 3.

FIG. 5 is a sectional view taken along line 5—5 of FIG. 3.

FIG. 6 is a sectional view taken along line 6—6 of FIG. 3.

FIGS. 7-10 are sequential views showing the manner in which the outrigger of this invention may be formed.

FIG. 11 is a sectional view taken along line 11—11 of FIG. 10.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
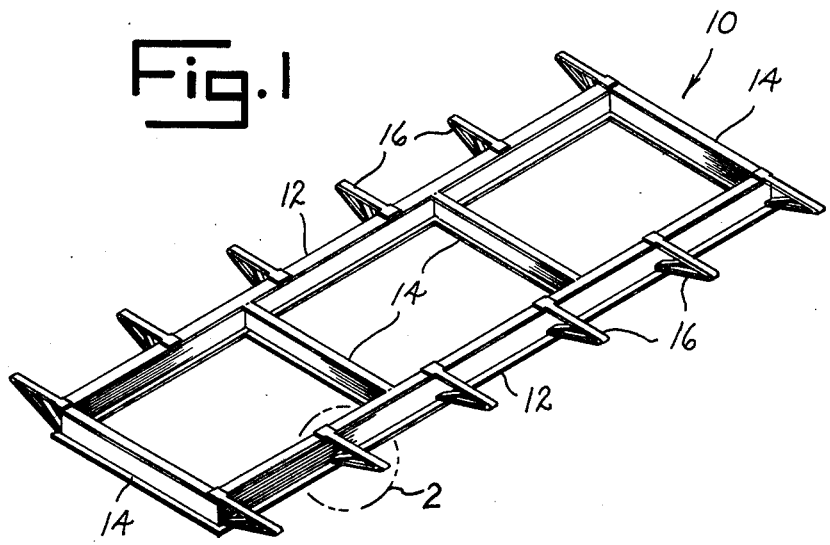
FIG. 1 is a perspective view of a mobile home chassis.
Figure 2:
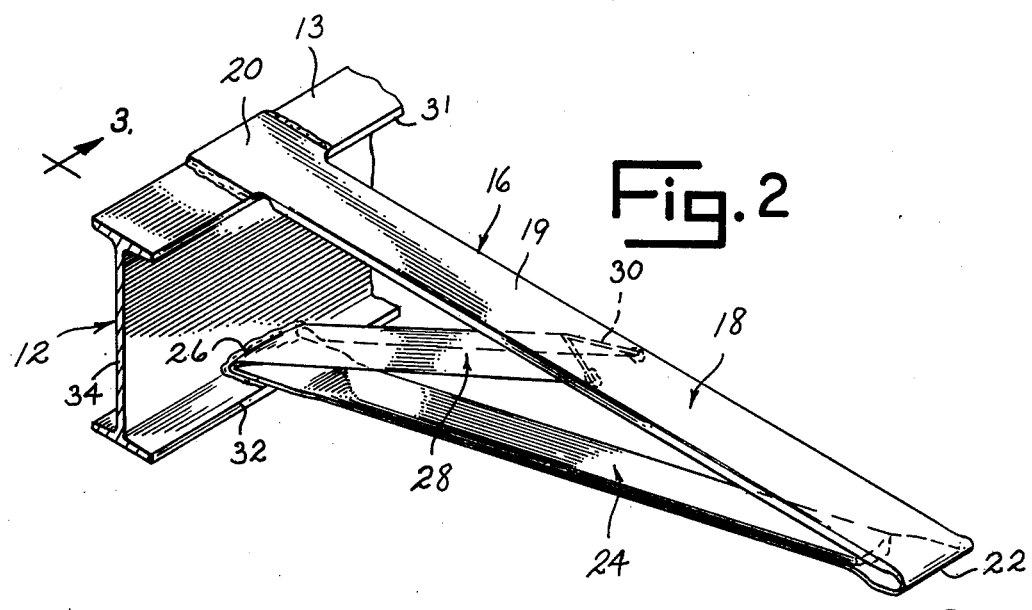
FIG. 2 is an enlarged view of an outrigger of the chassis as shown within broken line circle 2 of FIG. 1.
Figure 3:
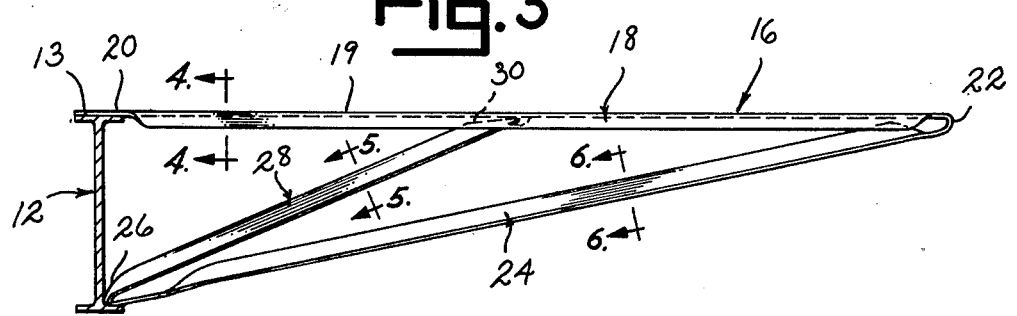
FIG. 3 is a sectional view taken along line 3—3 of FIG. 2.

Chassis 10 shown in FIG. 1 includes longitudinal frame members 12 which are interconnected by a plurality of longitudinally spaced transverse frame members 14. Frame members 12 and 14 are formed of structural steel and are shown to be I-beam constructions. A plurality of outriggers 16 are attached to each longitudinal frame member 12 and project laterally outwardly from the frame member. Each outrigger 16 carried by one longitudinal frame member 12 is ordinarily positioned oppositely of an outrigger 16 carried by the other longitudinal frame member 12, although the positioning of outriggers 16 along the longitudinal frame members of a particular chassis can vary depending upon the desired type of support for the overlying mobile home. Normally, an axle and wheel assembly is connected to chassis 10 to enable the mobile home to be moved from the manufacturer or dealer to the building or home use site.

Each outrigger 16 includes an upper horizontal section 18 which is connected at one end 20 to a longitudinal frame member 12 so that the upper support surface 19 of the horizontal section lies adjacent to the plane of the upper surface 13 of its connected longitudinal frame member 12. A bend 22 is formed at the opposite end of horizontal section 18 of each outrigger 16. A lower angled section 24 extends from bend 22 toward longitudinal frame member 12. Angled section 24 of each outrigger 16 terminates near the lower edge of the longitudinal frame member where it is connected to the frame member. There a bend 26 joins angled section 24. A brace section 28 forming a part of each outrigger 16 extends diagonally upwardly from bend 26 to a location intermediate and between the ends of the horizontal section 18. Upper end 30 of brace section 28 is attached such as by welding to the under surface of horizontal section 18 of the outrigger.

Horizontal section 18 of each outrigger 16, as indicated in FIG. 4, has an inverted U-shaped cross sectional configuration and angular section 24 of each outrigger, as indicated in FIG. 6, has an upright V-shaped cross sectional configuration. Brace section 28 of each outrigger, as indicated in FIG. 5, has an inverted V-shaped configuration. Such channel shaped configuration for outrigger sections 18, 24 and 28 adds structural strength to the strip material from which each outrigger 16 is formed. Each outrigger 16 is preferably formed of a structural steel and is joined to a longitudinal frame member 12, which is illustrated to be of an I-beam construction, by having end 20 of its horizontal section 18 overlying and welded to upper flange 31 of the frame member and by having its angled section 24 fitted upon flange 32 adjacent web 34 of the frame member and welded thereto at bend 26.

FIGS. 7–10 are illustrative of the manner in which each outrigger 16 may be formed. A flat strip 36 of structural steel, shown in FIG. 7, is placed in a suitable press which forms two V-shaped channels 38 and 40 and a generally U-shaped channel 42 in the strip. Separating channels 38 and 40 is a flat strip section 39 and separating channel 40 from channel 42 is a flat strip section 44. Strip 36 with its formed channels 38, 40 and 42 is then bent as illustrated in FIGS. 9 and 10 to position channel 38 in an angled position over channel 40 as shown by arrow 46. This is followed by the bending of strip 36 to position channel 42 over channel 40 into contact with end 30 of brace section 28 of which channel 38 is a part, as illustrated by arrow 48. With outrigger 16 thus formed from strip 36, the outrigger may now be welded to a longitudinal frame member 12 as previously described with end 30 of brace section 28 being welded to overlying horizontal section 18. If desired, the welding between brace section 28 and horizontal section 18 may be accomplished prior to the welding of the outrigger to the longitudinal frame member.

It is to be understood that the invention is not to be limited to the details above given, but may be modified within the scope of the appended claims.

What I claim is:

1. In a chassis for a mobile home, said chassis including longitudinal frame members interconnected by a plurality of transverse frame members, each longitudinal frame member having an inner side and an outer side, the inner sides of said longitudinal frame members being oppositely positioned, outriggers projecting laterally from the outer side of each longitudinal frame member, the improvement wherein each outrigger is of a one piece strip construction comprising:

an upper horizontal section, a lower angled section, and a brace section; said horizontal section connected at one end to a said longitudinal frame member and having its other end spacedly located from said longitudinal frame memeber; said angled section connected at one end by a first bend to the other end of said horizontal section and extending downwardly therefrom under said horizontal section;

said angled section terminating at its other end adjacent the longitudinal frame member; said brace section having one end connected by a second bend to the other end of said angled section and extending diagonally therefrom between said angled section and horizontal section, said brace section terminating at its other end at a location intermediate the ends of said horizontal section; the other end of said brace section being connected to said horizontal section at said location; said angled and brace sections being connected to said longitudinal frame member adjacent said second bend spacedly below the connection of said horizontal section one end to the longitudinal frame member.

2. The chassis of claim 1 wherein each horizontal section of a said outrigger is of an inverted generally U-shaped cross sectional configuration.

3. The chassis of claim 2 wherein each angled section of a said outrigger is of a V-shaped cross sectional configuration.

4. The chassis of claim 3 wherein each brace section of a said outrigger is of an inverted V-shaped cross sectional configuration.

5. The chassis of claim 4 wherein each brace section one end is connected to the horizontal section of its outrigger approximately midway between said ends of the horizontal section.

6. The chassis of claim 1 wherein each longitudinal frame member includes upper and lower flanges interconnected by a vertical web, said one end of the horizontal section of each outrigger being connected to said longitudinal frame member upper flange and said other end of the angled section of each outrigger being connected to said longitudinal frame member lower flange.

7. The chassis of claim 6 wherein one end of the horizontal section of each outrigger overlies said longitudinal frame member upper flange and said other end of the angled section of each outrigger overlies said longitudinal frame member lower flange.

* * * * *